United States Patent
Noffsinger et al.

(10) Patent No.: US 9,419,398 B2
(45) Date of Patent: Aug. 16, 2016

(54) ADAPTIVE ENERGY TRANSFER SYSTEM AND METHOD

(71) Applicant: GENERAL ELECTRIC COMPANY, Schenectady, NY (US)

(72) Inventors: Joseph Forrest Noffsinger, Lees Summit, MO (US); Aaron Richard Mitti, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 161 days.

(21) Appl. No.: 13/939,326

(22) Filed: Jul. 11, 2013

(65) Prior Publication Data

US 2014/0041980 A1    Feb. 13, 2014

Related U.S. Application Data

(60) Provisional application No. 61/681,843, filed on Aug. 10, 2012.

(51) Int. Cl.
| | | |
|---|---|---|
| *H01R 41/00* | (2006.01) | |
| *B60M 3/00* | (2006.01) | |
| *B61L 1/18* | (2006.01) | |
| *B61L 3/12* | (2006.01) | |
| *B61L 13/04* | (2006.01) | |

(Continued)

(52) U.S. Cl.
CPC ............... *H01R 41/00* (2013.01); *B60M 3/00* (2013.01); *B61L 1/181* (2013.01); *B61L 3/125* (2013.01); *B61L 13/047* (2013.01); *B61L 27/0038* (2013.01); *B61L 1/20* (2013.01)

(58) Field of Classification Search
CPC ........... H01R 41/00; B61L 1/18; B61L 1/181; B61L 3/04; B61L 3/047; B60M 3/00; B60M 3/06
See application file for complete search history.

(56) References Cited

U.S. PATENT DOCUMENTS

| | | | | |
|---|---|---|---|---|
| 4,773,590 A | * | 9/1988 | Dash | E01B 11/54 238/153 |
| 2004/0010432 A1 | | 1/2004 | Matheson et al. | |
| 2010/0084916 A1 | * | 4/2010 | Kumar | B60L 9/00 307/9.1 |

(Continued)

FOREIGN PATENT DOCUMENTS

| | | |
|---|---|---|
| DE | 3538165 A1 | 4/1987 |
| DE | 4225800 C1 | 11/1993 |

(Continued)

OTHER PUBLICATIONS

International Search Report and Written Opinion issued in connection with corresponding PCT Application No. PCT/US2013/053128 dated Jun. 23, 2014.

(Continued)

*Primary Examiner* — Zachary Kuhfuss
(74) *Attorney, Agent, or Firm* — GE Global Patent Operation

(57) ABSTRACT

Systems and methods of the invention relate to transferring energy from a vehicle to a device via a track circuit. Embodiments of the present invention include a power source of a vehicle that can be utilized to transfer energy through a track circuit to a device coupled thereto. The track circuit can include a section of track having a first pair of insulated joints located on a first rail and a second pair of insulated joints on a second rail, each pair separated by a distance. Moreover, a signal can be communicated to the vehicle based on receipt of the transferred energy.

14 Claims, 5 Drawing Sheets

(51) Int. Cl.
  *B61L 27/00* (2006.01)
  *B61L 1/20* (2006.01)

(56) References Cited

U.S. PATENT DOCUMENTS

| | | | |
|---|---|---|---|
| 2010/0318247 A1 | 12/2010 | Kumar | |
| 2011/0307113 A1* | 12/2011 | Kumar | B60M 3/00 700/291 |
| 2013/0169037 A1 | 7/2013 | Bieg et al. | |

FOREIGN PATENT DOCUMENTS

| | | |
|---|---|---|
| DE | 102010045234 A1 | 3/2012 |
| RU | 2273567 C1 | 4/2006 |
| RU | 2299144 C2 | 5/2007 |
| RU | 2320498 C1 | 3/2008 |
| WO | 2007111768 A2 | 10/2007 |
| WO | 2008147668 A1 | 12/2008 |
| WO | 2012041978 A2 | 4/2012 |

OTHER PUBLICATIONS

Office Action issued in connection with corresponding EA Application No. 201591504 on Apr. 6, 2016.

Office Action issued in connection with corresponding AU Application No. 2015205877 on Apr. 15, 2016.

* cited by examiner

ADAPTIVE ENERGY TRANSFER SYSTEM AND METHOD

CROSS-REFERENCE TO RELATED APPLICATIONS

This application claims the benefit of U.S. Provisional Application Ser. No. 61/681,843, filed Aug. 10, 2012, and entitled "ADAPTIVE ENERGY TRANSFER SYSTEM AND METHOD." The entirety of the aforementioned application is incorporated herein by reference.

BACKGROUND

1. Technical Field

Embodiments of the subject matter disclosed herein relate to transferring a portion of energy from a vehicle to a device.

2. Discussion of Art

Devices or equipment can be located at geographic areas that do not have a power source or may be located in an area that a power source is not accessible. This can hinder the employment of devices and wayside equipment (as well as location of such devices and equipment) within the transportation industry.

It may be desirable to have a system and method for power systems that differ from those that are currently available.

BRIEF DESCRIPTION

In one embodiment, a method is provided. The method includes generating a portion of power with a vehicle. The method further includes transferring the portion of power to a track circuit with a part of the vehicle, to power a device (e.g., a wayside device that is off-board the vehicle) coupled to the track circuit.

In another embodiment of the method, the method further includes receiving the portion of power at the device coupled to the track circuit, and powering the device with the portion of power that is received.

In another embodiment, a system comprises a vehicle, a detector component, and a manager component. (For example, the detector component and the manager component may be on-board the vehicle.) The vehicle includes a power source, and is configured to travel over a track that includes a track circuit. The detector component is configured to identify the track circuit. The manager component is configured to activate a transmission of a portion of power from the vehicle to a device coupled to the track, responsive to identifying the track circuit, for powering the device.

In another embodiment, a system comprises a vehicle, a detector component, and a manager component. (For example, the detector component and the manager component may be on-board the vehicle.) The vehicle includes a power source, and is configured to travel over a track that includes a first rail and a second rail. The detector component is configured to identify at least one position of one or more insulated members of at least one of the first rail or the second rail. The manager component is configured to activate a transmission of a portion of power from the vehicle to a device coupled to the track, responsive to the at least one position that is identified, for powering the device. (The at least one position that is identified may comprise a geographic location of the insulated member, a location of the insulated member defined in relation to some other reference, the presence of the insulated member in or at a boundary of a block of the track circuit through which the vehicle is traveling, the presence of the insulated member otherwise in relation to the vehicle or another reference point, or the like.)

For example, in an embodiment, the system may include a first pair of insulated members that includes a first insulated member located on the first rail at a first position and a second insulated member located on the first rail at a second position, in which the first position is separated from the second position by a first distance. The system further includes a second pair of insulated members that includes a third insulated member located on the second rail at a third position and a fourth insulated member located on the second rail at a fourth position, the third position being separated from the fourth position by a second distance. (The first and second distances may be non-zero distances, and may be the same as one another or different from one another.) The at least one position that the detector component is configured to identify comprises at least one of the first position, the second position, the third position, and/or the fourth position of the insulated members. The manager component is configured to activate the transmission of the portion of power from the vehicle responsive to the at least one of the first position, the second position, the third position, and/or the fourth position that is identified.

In another embodiment, a system is provided. The system includes means for generating a portion of power with a vehicle. The system includes means for identifying a track circuit for the vehicle, the track circuit includes a first rail and a second rail. The system includes means for transferring the portion of power to the track circuit, to power a device coupled to the track circuit.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
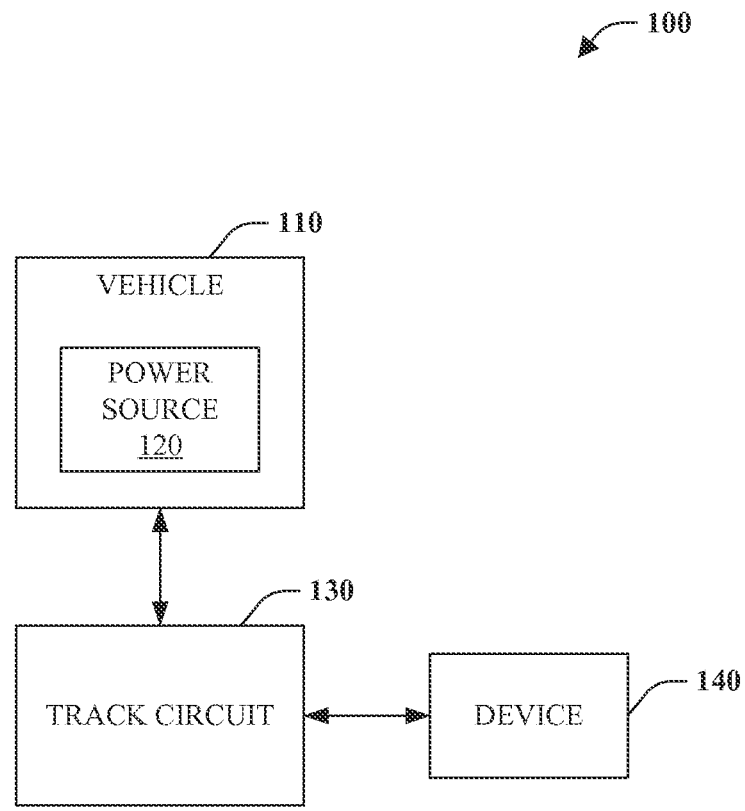
FIG. 1 is an illustration of an embodiment of a system for transferring energy from a vehicle to a device via a track circuit.

Embodiments of the invention relate to methods and systems for transferring energy from a vehicle to a device via a track circuit. In particular, a vehicle can include equipment for transferring energy from a power source of the vehicle to a track circuit and a device coupled to the track circuit. For example, the device may be off-board the vehicle, and the power/energy that is transferred may be used to power the device. The track circuit can include a section of track having a first insulated member between a first rail and a second rail and a second insulated member a distance from the first insulated member. Based on a power input for the device, the transfer of energy can be adjusted (e.g., increased amount, decreased amount, frequency change, and the like). A signal can be communicated to the vehicle based on receipt of the transferred energy.

The term "client asset" as used herein means a fixed asset or a mobile asset that is owned and/or operated by a client entity such as, for example, a railroad, a power generation company, a shipping company (e.g., land, sea, air, and/or any combination thereof), a mining equipment company, an airline, or any other asset-owning and/or asset-operating entity. The terms "container" and "trailer" may be used interchangeably herein and refer to a storage medium configured to hold products, goods, or other shippable materials.

The term "vehicle" as used herein can be defined as any asset that is a mobile machine that transports at least one of a person, people, or a cargo. For instance, a vehicle can be, but is not limited to being, a rail car, an intermodal container, a locomotive, a marine vessel, a mining equipment, an industrial equipment, a construction equipment, and the like.

The term "part" as used herein can be defined as a portion of a client asset and/or a portion of a vehicle, wherein the "part" is associated with the client asset or the vehicle, incorporated into the client asset or vehicle, coupled to the client asset or vehicle, or attached to the client asset or the vehicle.

The term "Positive Train Control" or "PTC" as used herein refers to communication-based/processor-based train control technology that provides a system capable of reliably and functionally preventing train-to-train collisions, overspeed derailments, incursions into established work zone limits, and the movement of a train through a main line switch in the improper position.

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. "Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk. "Computer memory", as used herein, refers to a storage device configured to store digital data or information which can be retrieved by a computer or processing element. "Controller", as used herein, refers to the logic circuitry and/or processing elements and associated software or program involved in controlling an energy storage system. The terms "signal", "data", and "information" may be used interchangeably herein and may refer to digital or analog forms.

FIG. 1 is an illustration of a system 100 for transferring energy from a vehicle to a device via a track circuit. The system 100 can include a vehicle 110 having at least one power source 120. The power source can be incorporated into the vehicle (as depicted), a stand-alone component, and/or a combination thereof. For example, the power source can generate power with the vehicle, as a stand-alone device, or a combination thereof. In an embodiment, the power source generates power in combination with the vehicle in order to leverage an amount of power created with the vehicle and/or associated components, devices, and the like.

Figure 3:
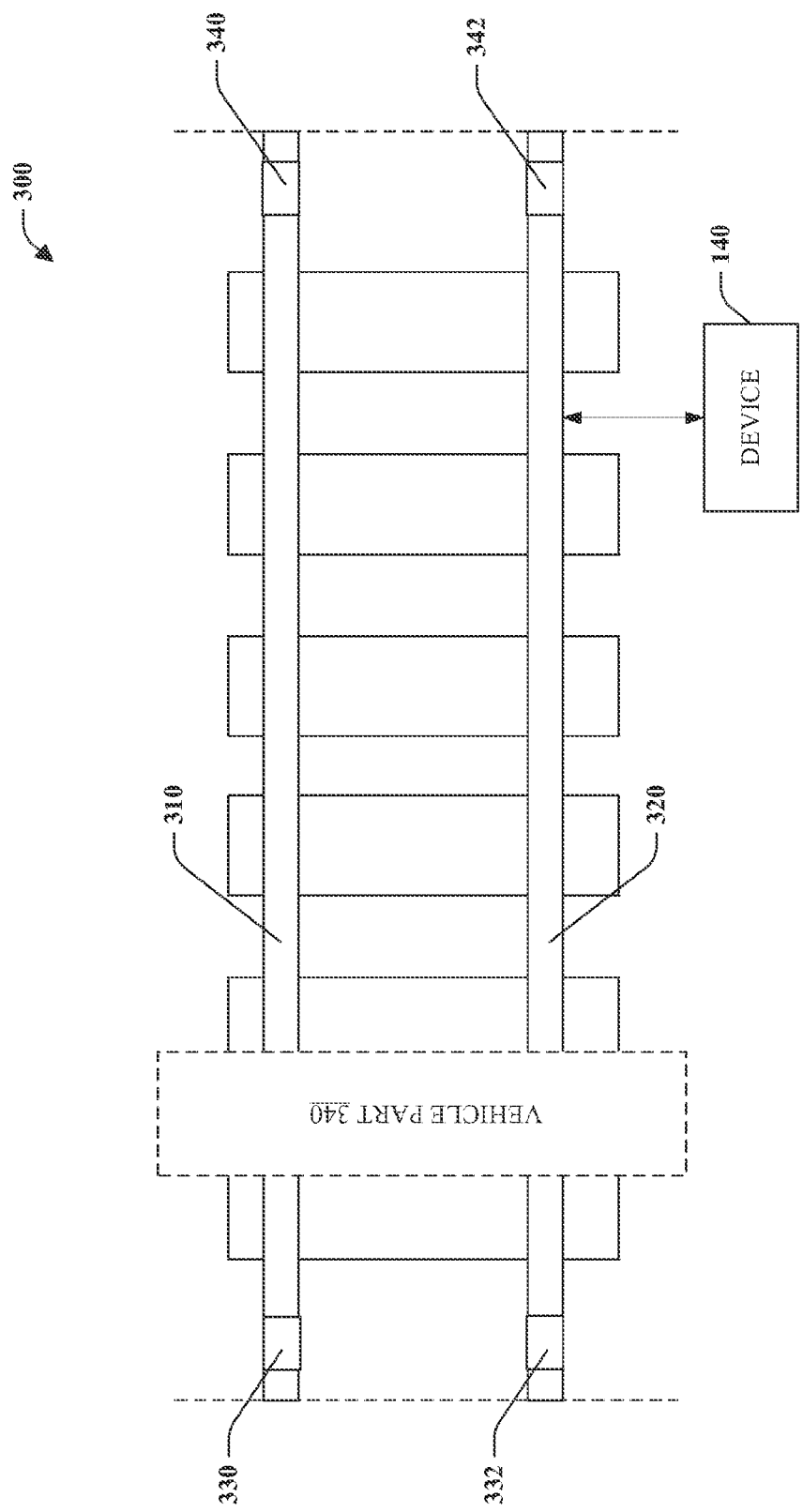
FIG. 3 is an illustration of an embodiment of a system for transmitting electricity with a portion of track for a vehicle.

The vehicle can be coupled (e.g., coupled physically, coupled wirelessly, among others) to a track circuit 130 (discussed in more detail in FIG. 3). The power source can transfer power through the track circuit to a device 140. Based on the generated power from the power source associated with the vehicle, the device can be powered and operate with said power upon receipt via the track circuit. The powering of the device can be implemented from a distance between the device and the vehicle and/or power source. For instance, the track circuit can be a circuit that enables power to transfer from the vehicle and/or power source over a distance to the device.

By way of example and not limitation, the vehicle can be coupled to a track, wherein the track can be the track circuit. Following this example, the device can be, for instance, wayside equipment, an electrical device, a client asset, a defect detection device, a device utilized with PTC, a signal system component(s), a device utilized with Automated Equipment Identification (AEI), among others. Since the track circuit (here the track) can be conductive and enable power to transfer from the vehicle and/or power source, the device can be powered from a distance (e.g., a distance that the conductive track circuit can transfer power from the power source to the device). Since the device can be powered by the power source from a vehicle (e.g., a remote power source), the device can be a stand-alone device independent of a power source (e.g., independent of a local power source). For example, receiving power over the track circuit from a vehicle may be the device's only source of power. Thus, a stand-alone device can be utilized by leveraging power generated and transferred from the vehicle.

As discussed, the device can be an electrical device, wayside equipment, a client asset, a defect detection device, a device utilized with PTC, and/or a device utilized with AEI. In an embodiment, the device can be a defect device such as, but not limited to, a hot box detector, a hot wheel detector, a dragging detector, a slide force detector, or a rock fall detector, among others.

In another embodiment, the device can be a device utilized with AEI. AEI is an automated equipment identification mechanism that can aggregate data related to equipment for the vehicle. By way of example and not limitation, AEI can utilized passive radio frequency technology in which a tag (e.g., passive tag) is associated with the vehicle and a reader/receiver receives data from the tag when in geographic proximity thereto. The AEI device can be a reader or receiver that collects or stores data from a passive tag, a data store that stores data related to passive tag information received from a vehicle, or an antenna that facilitates communication between the vehicle and a passive tag, among others.

In another embodiment, the device can be an energy storage device that collects power transferred via the track circuit from the power source. The energy storage device can aggregate power from the vehicle and/or power source to be utilized for equipment, devices, among others. For instance, an energy storage device can collect transferred power and store such power for use with equipment when a power source is not available for such equipment (e.g., power outage, brown out, black out, power grid failure, power grid malfunction, among others).

In another embodiment, the device can be a signaling device for the vehicle. For instance, the vehicle can travel on a track system, wherein the track system can include signaling devices to provide warning to other entities such as other vehicles, people, and the like. The signaling devices can be, but not limited to, a light, a motorized gate arm (e.g., motorized motion in a vertical plane), an audible warning device, among others.

In another embodiment, the device can be utilized with PTC. As noted above, PTC refers to communication-based/processor-based train control technology that provides a system capable of reliably and functionally preventing train-to-train collisions, over speed derailments, incursions into established work zone limits, and the movement of a train through a main line switch in the improper position. PTC systems can perform other additional specified functions. PTC systems vary widely in complexity and sophistication based on the level of automation and functionality implemented. For instance, a PTC system can include variations such as system architecture used, wayside system basis (e.g. non-signaled, block signal, cab signal, among others), degree of train control capability, among others. The following are examples of PTC systems and is not to be limiting on the subject invention. In an embodiment, the PTC system can be an Advanced Civil Speed Enforcement System (ACSES). The ACSES system can be transponder-based. Another PTC system can be an Electronic Train Management System (TMS), which can be a Global Positioning System (GPS) and communications-based system. In another embodiment, the PTC system can be a Vital Electronic Train Management System or I-ETMS which can be a GPS and communications-based system. In another embodiment, the PTC system can be an Incremental Train Control System (ITCS) that can be a GPS and communications-based system.

In another embodiment, as noted above, the device can be a defect device that can monitor a defect event for the vehicle and/or a track associated with the vehicle. For instance, a hot box detector can detect an overheating condition for an axle bearing. In another instance, a hot wheel detector can monitor axle, wheel, and/or brake temperatures indicating overheating. In another instance, a dragging detector can detect whether the vehicle is dragging an item, object, among others. In still another instance, a slide force detector or rock fall detector can monitor whether debris is falling or has fallen onto a path of the vehicle (e.g., a track, a railway, among others).

Figure 2:
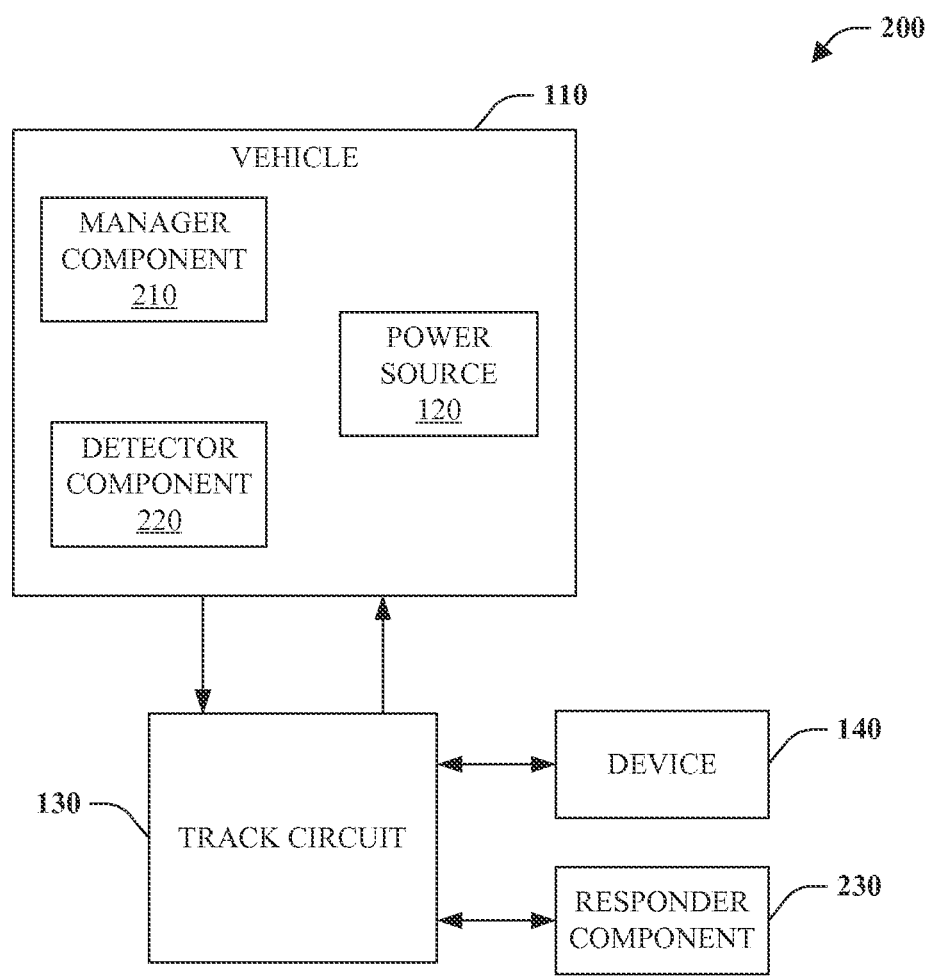
FIG. 2 is an illustration of an embodiment of a system for transmitting a portion of energy from a vehicle power source to a device based on a detection of a track circuit.

FIG. 2 is an illustration of a system 200 for transmitting a portion of energy from a vehicle power source to a device based on a detection of a track circuit. The vehicle can include the power source 120 that can generate a portion of power that can be transferred via the track circuit to the device, wherein the device can be a distance from the vehicle and/or the power source.

The vehicle can include a manager component 210 that can be configured to activate a transmission of the portion of power. In another instance, the manager component can be configured to activate or deactivate a transfer of the portion of power from the power source to the device. Moreover, the manager component can be configured to adjust parameter(s) associated with the portion of power. For instance, the manager component can adjust an amount of power transferred, a frequency at which the power is transferred (e.g., a pulsed power delivery, AC power, among others), a duration of time the portion of power is transferred, among others. Such parameter(s) can be adjusted by the manager component based on at least one of a geographic location of the vehicle or the device or an identification of the device (e.g., type, location, make, model, among others).

The manager component can leverage a geographic location of the vehicle or the device in order to adjust a parameter for the portion of power that can be transferred to the device from the power source. For instance, the amount of power transferred can be adjusted by the manager component based on the device power input. By way of example and not limitation, the portion of power transferred can meet or be below the device power input in order to reduce risk of damage to the device. In another example, the geographic location of the vehicle and/or the device can be utilized to identify a particular device and, in turn, a power input for such device. The geographic location of the vehicle and/or the device can be ascertained by a location on a track circuit, identification of the track circuit (discussed below), GPS, among others.

The system can include a detector component 220 that can be configured to identify at least a portion of the track circuit. In particular, the track circuit (as discussed in FIG. 3) can include a first position and a second position, wherein the first position corresponds to a start of the track circuit and the second position can correspond to an end of the track circuit. The detector component identifies the first position and/or the second position, wherein the device is coupled (e.g., coupled physically, coupled wirelessly, among others) there between. For instance, the manager component can activate or deactivate the transfer of a portion of power to the device based on the detector component, wherein the activation can initiate upon identification of the first position and the deactivation can initiate upon identification of the second position.

Additionally, the detector component can aggregate information related to the track circuit. By way of example and not limitation, the detector component, upon detection of a portion of the track circuit, can identify the particular track circuit, coupled devices, geographic location of devices or track circuit, among others. Such information can be utilized by the manager component in order to ascertain power parameter(s) for the transfer of the portion of power.

A responder component 230 can be included with the system 200. The responder component 230 can be configured to communicate a signal to the vehicle from the device and/or on behalf of the device. The responder component can be a stand-alone component (as depicted), incorporated into the device, and/or a combination thereof. The responder component can communicate with the vehicle by a hard-line connection (e.g., wired connection, among others), a wireless connection, a LAN connection (e.g., Internet Protocol (IP) related connection, among others), a WAN connection, and/or a suitable combination thereof. The responder component can initiate a communication of the signal from the device to the vehicle (e.g., a receiver linked to the vehicle, a receiver coupled to the vehicle, a receiver on-board the vehicle, among others) based on, for instance, a receipt of a portion of power from the vehicle, an amount of power received from the vehicle, a duration of time receiving a portion of power, the vehicle proximate to the first position of the track circuit, among others. By way of example and not limitation, the communication can be a confirmation signal (e.g., confirming the receipt of the portion of power), a summary of receipt (e.g., information related to the received portion of power from the vehicle and/or power source), an error message (e.g., a message informing of an error, malfunction, and the like), among others.

In an embodiment, the responder component can be employed as an integrity-check system that enables one or more devices to be evaluated for operability. For instance, the responder component can facilitate detecting a defective device, an inoperative device, an error related to a device, among others. The signal communicated from the responder component to the vehicle can be utilized to provide integrity-check for at least one device.

In another embodiment, the transfer of a portion of power to the device and/or an incomplete transfer of power can be utilized as an integrity check for at least one of a device or a portion of a track. For instance, a transfer of power that is not received by the device can indicate a break in the circuit (e.g., a portion of a rail) which can allow the vehicle to proceed with caution as the track may be damaged. Additionally, a device can be integrity checked based on a known location thereof and whether or not such device receives power or communicates a signal to the vehicle.

By way of example and not limitation, the manager component can identify a particular track circuit and/or a number of devices coupled to the particular track circuit. Based on the particular track circuit and/or the number of devices, the system can evaluate signals received from one or more responder components for such particular track circuit. For instance, if the track circuit includes four (4) coupled devices, the vehicle and/or manager component can receive four (4) or less signals. If less than four (4) signals are received, the system can ascertain a malfunction with at least one device coupled to the particular track circuit.

In an embodiment, the signal communicated by the responder component and/or on behalf of the device can include diagnostic information. For instance, the device can include a diagnostic routine or check that includes a test on, for example, inputs, connections, outputs, power level(s), virus scan, malware scan, health status, among others. Such diagnostic routine or check can be communicated to the vehicle and/or the manager component with the signal from the responder in order to ascertain a health status of the device and/or devices.

FIG. 3 is an illustration of a system 300 for transmitting electricity with a portion of track for a vehicle. The system can be an exemplary embodiment of a track circuit as discussed in FIGS. 1 and 2. The system can be a track that includes a first rail 310 and a second rail 320, wherein the first rail and/or the second rail can be a conductive material that conducts electricity, power, and the like. An insulated member can be included with the track at a first position and a second position in which the first position is separated by the second position by a distance. The insulated member can provide electrical isolation for a section of electrical conductive material. For instance, the member can be an insulated joint, an insulated portion of a rail, among others. By way of example and not limitation, an insulated joint is used as an exemplary embodiment and it is to be appreciated that the insulated joint can be an insulated member.

The track includes a first pair of insulated joints 330, 340 that separates a distance of rail for the first rail and a second pair of insulated joints 332, 342 that separates a distance of rail for the second rail. The connectivity of the insulated joints creates a conductive circuit or loop on the first rail and a separate conductive circuit or loop on the second rail in between the respective insulated joints. By insulating a distance of the track, such distance of the track can be a conductive circuit that is in an open condition, wherein the open condition can be switched to a closed circuit with a vehicle part 350. In one example, the vehicle part can complete the circuit that exists between the first rail and the second rail within the distance between the insulated joints since the vehicle part bridges and/or connects the first rail to the second rail. It is to be appreciated that the system can include one or more vehicle part(s).

In an embodiment, the vehicle part can be at least one wheel or axle of the vehicle. In another embodiment, the vehicle part can be at least one set of coils. For example, the set of coils can be coupled to the track (e.g., the first rail, the second rail) in which the coupling is a wireless connection or a physical connection. By way of example and not limitation, the set of coils can utilize wireless energy transfer to the track. Based on the vehicle part completing the track circuit for transfer of a portion of power, the device can receive the portion of power. It is to be appreciated that the device can be coupled to at least one of the track, the first rail, the second rail (as depicted), and/or a combination thereof Each insulated joint can include an identification (not shown) that can correspond to the particular track circuit, geographic location, and/or coupled devices within the particular track circuit. It is to be appreciated that the identifications can be a indicia, a unique indicia, a serial number, a GPS position or coordinate, a number, a code, a combination of a number and a letter, among others. The identifications can be used to identify the track circuit so the manager component and/or the power source can transfer the portion of power with desired parameter(s).

In another embodiment, a set of coils can be utilized as the vehicle part that transmits an AC signal to at least one of a first rail or a second rail in order to transfer energy to the device. By way of example and not limitation, the set of coils can be located on a position in front of a lead axle in order to inject a signal into the track (e.g., first rail, second rail, and the like). The set of coils can be used to transfer a portion of power to the device without the use of an insulated joint. For example, a particular frequency signal can correspond to a particular distance for receiving the signal and/or the portion of power. A frequency signal that transmits power can be configured to travel a specific distance to power a device. By way of example and not limitation, a 15 KHz signal can power a device that is up to 200 feet away. By way of example and not limitation, a 2-3 Hz signal can power a device that is 5 or 10 miles away. In an environment without an insulated joint or pairs of insulated joints, a set of coils can transfer power to devices utilizing specific frequencies which can target devices based on a distance from the set of coils.

By way of example and not limitation, the transfer of power from the vehicle to the device via a track circuit (e.g., a rail, a track, among others) can be location-based. For instance, a geographic location of a device can be identified in order to initiate or trigger a transfer of power thereto. In an embodiment, the systems and/or methods can leverage a data base or data store (not shown) to provide a lookup table that includes device locations, device power ratings, device power inputs, number of devices within locations, among others. The data base or data store can allow the vehicle to transfer power based on a location of a device. In another embodiment, the vehicle can include a location determination system such as, but not limited to, a GPS unit, a transponder, dead reckoning, PTC equipment, PTC-based location determination techniques, among others. In another embodiment other signals on the track or track circuit can be utilized to identify a location. For instance, a particular signal for a railroad-highway crossing can be detected and the vehicle can ascertain a location in order to identify devices in such location. In another embodiment, integrity signals can be leveraged in order to identify a geographic location of a vehicle and/or a device.

The aforementioned systems, components, (e.g., transport manager, transport itinerary, work orders, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality.

Figure 4:
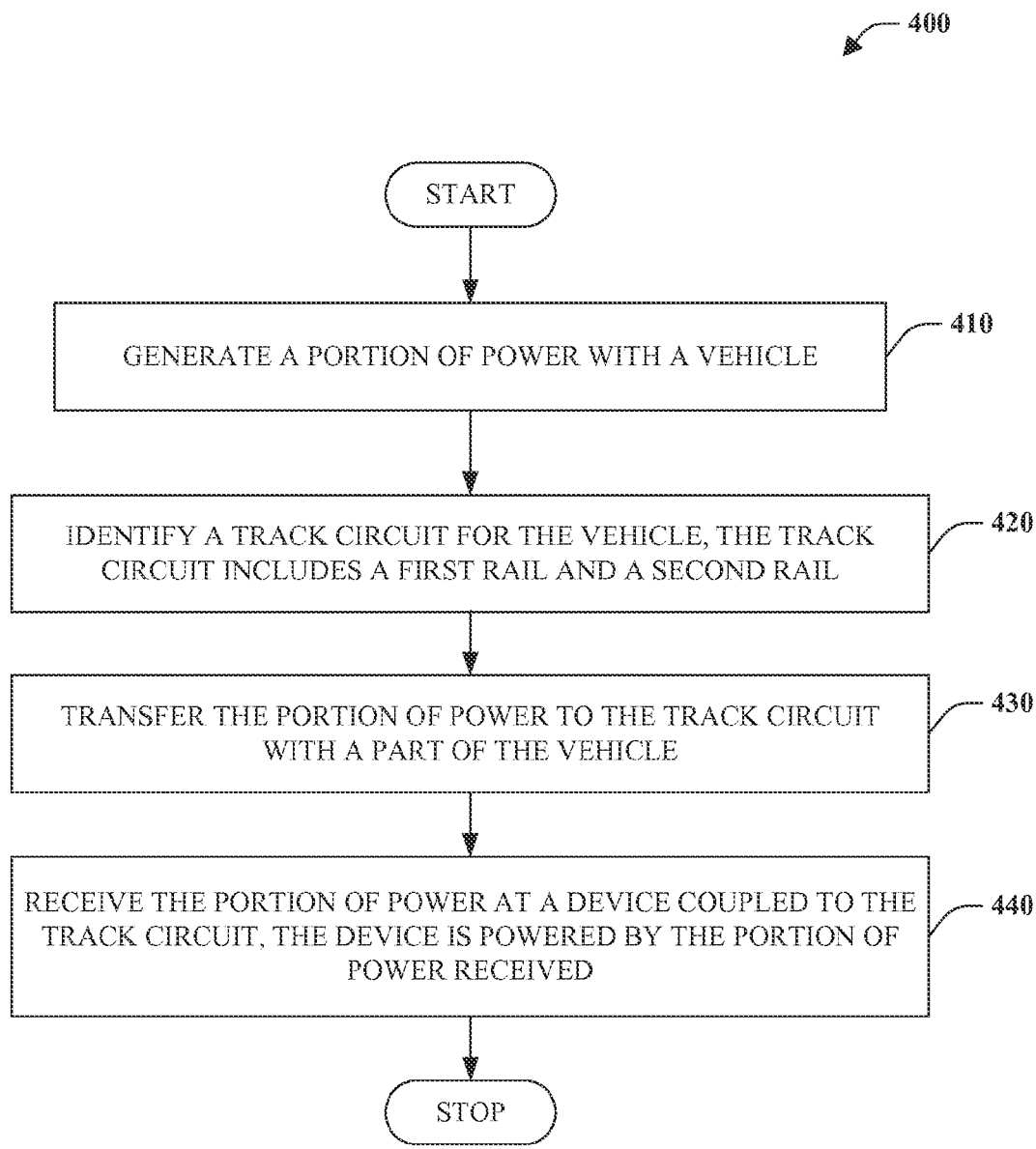
FIG. 4 illustrates a flow chart of an embodiment of a method for transferring energy from a vehicle to a device via a track circuit.
Figure 5:
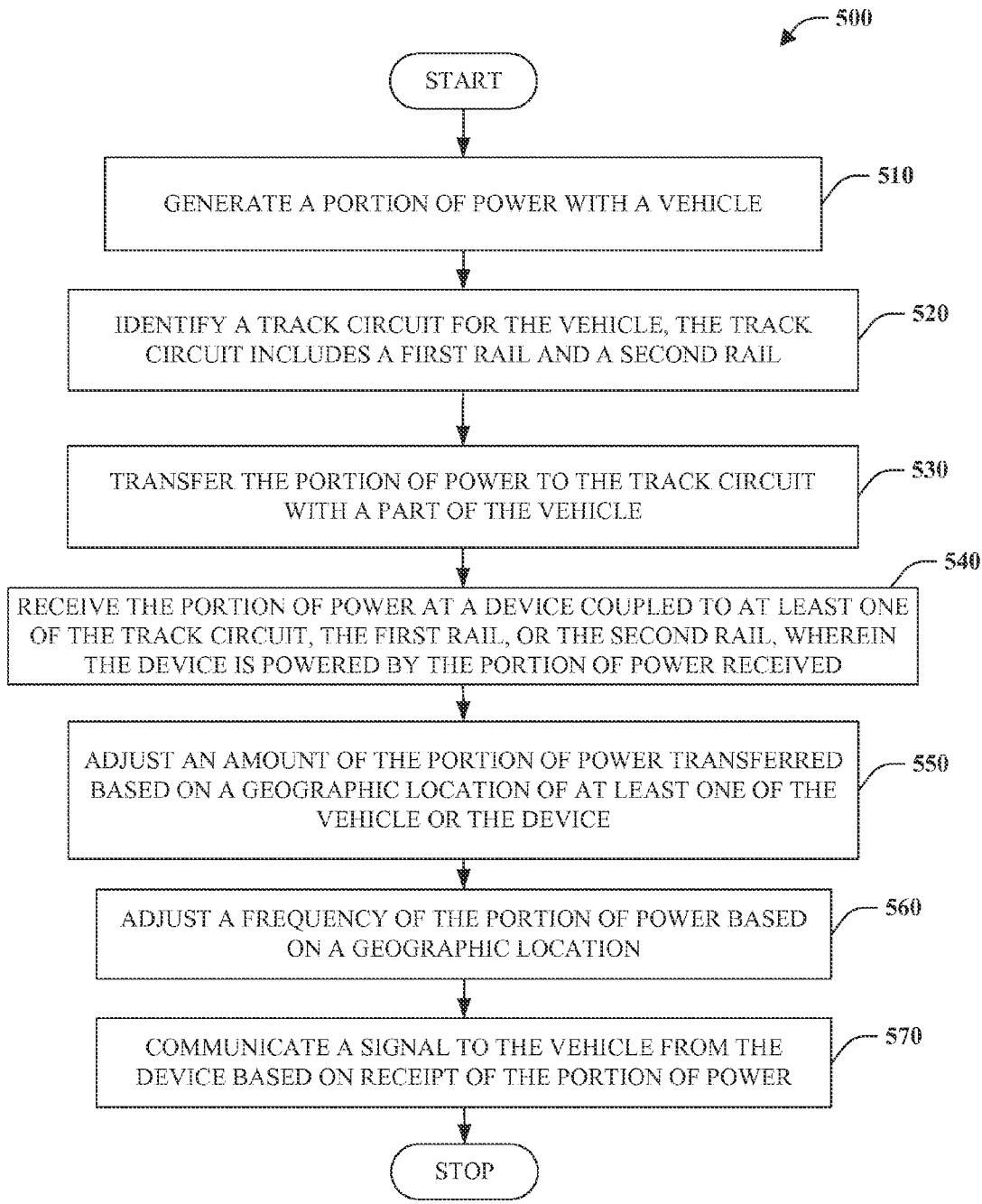
FIG. 5 illustrates a flow chart of an embodiment of a method for transmitting a portion of energy from a vehicle power source to a device based on a detection of a track circuit.

In view of the exemplary devices and elements described supra, methodologies that may be implemented in accordance with the disclosed subject matter will be better appreciated with reference to the flow charts of FIGS. 4 and 5. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 4 illustrates a method 400 for transferring energy from a vehicle to a device via a track circuit. At reference numeral 410, a portion of power can be generated with a vehicle. For instance, the portion of power can be generated by a generator, a power source, among others. In particular, the portion of power generated can be from the vehicle. At reference numeral 420, a track circuit for the vehicle can be identified, wherein the track circuit includes a first rail and a second rail (for example). At reference numeral 430, the portion of power can be transferred to the track circuit with a part of the vehicle, to power a device coupled to the track circuit. For instance, the part of the vehicle can be at least one axle, at least one wheel, a set of coils, among others. In another embodiment, with reference to numeral 440, the method may further comprise the portion of power being received at the device coupled to the track circuit, wherein the device is powered by the portion of power received.

FIG. 5 illustrates a method 500 for transmitting a portion of energy from a vehicle power source to a device based on a detection of a track circuit. At reference numeral 510, a portion of power can be generated with a vehicle. At reference numeral 520, a track circuit for the vehicle can be identified, wherein the track circuit includes a first rail and a second rail (for example). At reference numeral 530, the portion of power can be transferred to the track circuit with a part of the vehicle. For instance, the part of the vehicle can be at least one axle, a wheel, a set of coils, among others. At reference numeral 540, the portion of power can be received at a device coupled to the track circuit, wherein the device is powered by the portion of power received.

At reference numeral 550, an amount of the portion of power can be adjusted, wherein the adjustment is based on a geographic location of at least one of the vehicle or the device. At reference numeral 560, a frequency of the portion of power can be adjusted based on a geographic location. For instance, the frequency of power transmission to the device can be adjusted in order to avoid interference with a surrounding device utilizing a particular frequency. At reference numeral 570, a signal can be communicated to the vehicle from the device based on receipt of the portion of power.

In an embodiment, a system can be provided that includes means for generating a portion of power with a vehicle (e.g., power source 120). The system can include means for identifying a track circuit for the vehicle, the track circuit includes a first rail and a second rail (e.g., detector component 220, GPS unit, a transponder, dead reckoning, PTC equipment, PTC-based location determination techniques, and the like). The system can include means for transferring the portion of power to the track circuit to power a device coupled to the track circuit (e.g., manager component 210, sets of coils, a portion of track, a part of the vehicle, an insulated member, a first rail, a second rail, a combination thereof, and the like). The system can include means for receiving the portion of power at the device coupled to the track circuit, wherein the device is powered by the portion of power received (e.g., a hard wired connection between the track circuit and the device, among others).

In an embodiment, a method can be provided that can include at least one of the following steps: transmitting a request communication from the vehicle to the device; receiving a response communication at the vehicle from the device; and triggering the transmission of the portion of power based on the response communication. In an embodiment, the vehicle is a rail vehicle traveling on a rail track, the track circuit comprises at least part of the rail track, the device is a wayside device located off-board the rail vehicle, and the portion of power is transferred as electricity. In an embodiment, the method can include at least one of the following steps: receiving the portion of power at the device coupled to the track circuit; and powering the device with the portion of power received by the device from the vehicle. In an embodiment, the method can include at least the following steps: identifying the track circuit; and wherein the step of transferring the portion of power to the track circuit is initiated responsive to the identifying the track circuit.

In an embodiment, a method can be provided that can include at least the following steps: receiving a portion of power at a device coupled to a track circuit; and powering the device with the portion of power, wherein the portion of power is received over the track circuit from a vehicle. In an embodiment, the vehicle is a rail vehicle traveling on a rail track, the track circuit comprises at least part of the rail track, the device is a wayside device located off-board the rail vehicle, and the portion of power is transferred as electricity. In an embodiment, the method can include the following: receiving a request communication at the device from the vehicle; and transmitting a response communication from the device to the vehicle to trigger transmission of the portion of power from the vehicle to the device.

In an embodiment, a system can be provided that includes at least the following: a vehicle that includes a power source, wherein the vehicle is configured to travel over a track that includes a track circuit; a detector component that is configured to identify the track circuit; and a manager component that is configured to activate a transmission of a portion of power from the vehicle to a device coupled to the track circuit, based at least in part on identifying the track circuit, for powering the device. In an embodiment, the system can include the track includes a first rail and a second rail and the detector component is configured to identify the track circuit as at least one position of one or more insulated members of at least one of the first rail or the second rail.

In an embodiment, the system can include the following: the track comprises a first pair of insulated members that includes a first insulated member located on the first rail at a first position and a second insulated member located on the first rail at a second position, the first position is separated from the second position by a first distance; the track further comprises a second pair of insulated members that includes a third insulated member located on the second rail at a third position and a fourth insulated member located on the second rail at a fourth position, the third position is separated from the fourth position by a second distance; the at least one position that the detector component is configured to identify comprises at least one of the first position, the second position, the third position, or the fourth position; and the manager component is configured to activate the transmission of the portion of power from the vehicle responsive to the at least one of the first position, the second position, the third position, or the fourth position that is identified.

In an embodiment, the system can include the following: a wheel of the vehicle capable of contacting at least one of the first rail or the second rail; and the manager component is configured to activate the transmission of the portion of power through the wheel and further through the track to the device. In an embodiment, the system can include the following: at least one set of coils configured to transmit the portion of power to the track; wherein the manager component is configured to activate the transmission of the portion of power through the at least one set of coils to the track and to the device. In an embodiment, the system can include the following: the device; and a responder component that communicates a signal from the device to the vehicle based on the receipt of the portion of power. In an embodiment, the system can include the device, wherein the device is a defect detection device that monitors a defect event for at least one of the vehicle or the track, an Automatic Equipment Identification device, or a Positive Train Control device.

In an embodiment, a system is provided that can include at least means for receiving the portion of power at the device coupled to the track circuit, wherein the device is powered by the portion of power received.

The method can further include identifying at least one of a first insulated member associated with the track circuit and/or a second insulated member associated with the track circuit. The insulated members can provide electrical isolation from a first section of an electrical conductive material to a second section of the electrical conductive material. For instance, the member can be an insulated joint, an insulated portion of a rail, among others. By way of example and not limitation, an insulated joint is used as an exemplary embodiment and it is to be appreciated that the insulated joint can be an insulated member. The method can further include employing a start of the step of transferring based on the step of identifying the first insulated joint. The method can further include employing a stop of the step of transferring based on the step of identifying the second insulated joint. The method can further include transferring the portion of power based on a power input for the device. The method can further include identifying the device based on a geographic location of the vehicle. The method can further include transferring the portion of power to the device for a duration of time. The method can further include transferring the portion of the power to the device for the duration of time based on a power input of the device and an amount of the portion of power. With the method, the part of the vehicle can be at least one wheel or axle. With the method, the part of the vehicle can be at least one set of coils. The method can further include receiving a request communication at the device from the vehicle, transmitting a response communication from the device to the vehicle, and triggering the transmission of the portion of power based on the communication. The method can further include the portion of power to transmit the response communication.

With reference to the drawings, like reference numerals designate identical or corresponding parts throughout the several views. However, the inclusion of like elements in different views does not mean a given embodiment necessarily includes such elements or that all embodiments of the invention include such elements.

In the specification and claims, reference will be made to a number of terms that have the following meanings The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A method, comprising:
    generating a portion of power with a vehicle;
    transferring the portion of power to a track circuit with a part of the vehicle to power a device coupled to the track circuit;
    identifying a first insulated member associated with the track circuit and a second insulated member associated with the track circuit; and
    at least one of the following:
        responding to the first insulated member identification by initiating the transferring of the portion of power; or
        responding to the second insulated member identification by initiating a start of the step of transferring of the portion of power.

2. The method of claim 1, further comprising identifying a geographic location of the device and initiating a start of the step of transferring of the portion of power based on the geographic location.

3. The method of claim 1, further comprising transferring the portion of power based on a power input for the device in which the power input corresponds to a type of the device.

4. The method of claim 1, further comprising adjusting an amount of the portion of power transferred based on a geographic location of at least one of the vehicle or the device.

5. The method of claim 1, further comprising receiving a signal at the vehicle from the device, wherein the signal is generated by the device responsive to receiving the portion of power.

6. The method of claim 5, further comprising identifying the device based on a geographic location of the vehicle.

7. The method of claim 1, further comprising adjusting a frequency of a transmission of the portion of power, wherein the portion of power is transmitted with a pulsed delivery.

8. The method of claim 1, further comprising transferring the portion of power to the device for a duration of time based on a power input of the device and an amount of the portion of power.

9. A method, comprising:
generating a portion of power with a vehicle;
transferring the portion of power to a track circuit with a part of the vehicle to power a device coupled to the track circuit;
transmitting a request communication from the vehicle to the device;
receiving a response communication at the vehicle from the device; and
triggering the transmission of the portion of power based on the response communication.

10. The method of claim 1, wherein the vehicle is a rail vehicle traveling on a rail track, the track circuit comprises at least part of the rail track, the device is a wayside device located off-board the rail vehicle, and the portion of power is transferred as electricity.

11. The method of claim 1, further comprising:
receiving the portion of power at the device coupled to the track circuit; and
powering the device with the portion of power received by the device from the vehicle.

12. The method of claim 1, further comprising:
identifying the track circuit;
wherein the step of transferring the portion of power to the track circuit is initiated responsive to the identifying the track circuit.

13. A method, comprising:
receiving a portion of power at a device coupled to a track circuit;
powering the device with the portion of power, wherein the portion of power is received over the track circuit from a vehicle;
receiving a request communication at the device from the vehicle; and
transmitting a response communication from the device to the vehicle to trigger transmission of the portion of power from the vehicle to the device.

14. The method of claim 13, wherein the vehicle is a rail vehicle traveling on a rail track, the track circuit comprises at least part of the rail track, the device is a wayside device located off-board the rail vehicle, and the portion of power is transferred as electricity.

* * * * *